(12) United States Patent
Yalkut-Lubomirski et al.

(10) Patent No.: US 11,503,949 B2
(45) Date of Patent: Nov. 22, 2022

(54) SPLATTER PROTECTOR

(71) Applicant: LiQ Inc., Thornhill (CA)

(72) Inventors: Anna Yalkut-Lubomirski, Thornhill (CA); Eric Feigin-Lubomirski, Thornhill (CA)

(73) Assignee: LiQ Inc., Thornhill (CA)

( * ) Notice: Subject to any disclaimer, the term of this patent is extended or adjusted under 35 U.S.C. 154(b) by 165 days.

(21) Appl. No.: 16/931,977

(22) Filed: Jul. 17, 2020

(65) Prior Publication Data
US 2022/0015571 A1 Jan. 20, 2022

(51) Int. Cl.
*A47J 36/06* (2006.01)
*A47J 37/10* (2006.01)

(52) U.S. Cl.
CPC ............. *A47J 36/06* (2013.01); *A47J 37/101* (2013.01)

(58) Field of Classification Search
CPC A47J 36/06; A47J 37/101; A47J 27/00; A47J 27/13; A47J 27/12; A47J 27/05; A27J 27/084
USPC ...................................................... 220/573.1
See application file for complete search history.

(56) References Cited

U.S. PATENT DOCUMENTS

| 571,829 A * | 11/1896 | Duncan .................... A47J 36/36 |
| RE18,942 E | 9/1933 | Morris |
| 2,488,215 A | 11/1949 | Mayne |
| 2,957,601 A * | 10/1960 | Novick ............... B65D 21/0224 |
| | | 206/821 |
| 5,387,781 A | 2/1995 | Berkoff |
| 6,325,234 B1 * | 12/2001 | Legaspi ............... H05B 6/6408 |
| | | 220/573.1 |
| 8,960,081 B2 * | 2/2015 | Beard ...................... A47J 27/04 |
| | | 99/342 |
| 9,199,832 B2 * | 12/2015 | Fracasso ................. B67C 11/02 |
| 10,029,903 B1 * | 7/2018 | White ....................... B67C 9/00 |
| 2006/0027575 A1 | 2/2006 | Lombardo et al. |
| 2011/0253259 A1 * | 10/2011 | Sanford .................... B67C 9/00 |
| | | 141/319 |
| 2015/0314914 A1 * | 11/2015 | Sudakoff ............ B65D 51/1683 |
| | | 220/666 |
| 2015/0351588 A1 * | 12/2015 | Cheng ................... A47J 27/002 |
| | | 220/573.1 |
| 2016/0374505 A1 | 12/2016 | Reiner |
| 2016/0374512 A1 | 12/2016 | Reiner |
| 2018/0042426 A1 * | 2/2018 | Henry .................... A47J 37/101 |
| 2019/0110629 A1 * | 4/2019 | Truong ................... A47J 36/06 |
| 2019/0223645 A1 * | 7/2019 | Gauss ...................... F28F 3/025 |
| 2020/0029736 A1 * | 1/2020 | Huttner ................. A47J 37/101 |

\* cited by examiner

*Primary Examiner* — James N Smalley
*Assistant Examiner* — Laura E. Parker
(74) *Attorney, Agent, or Firm* — Rowand LLP

(57) ABSTRACT

A splatter protector including a hollow body having oppositely-directed first and second end portions. Each of the end portions may define a respective substantially circular end opening having an annular lip along the circumference thereof for engaging with upper edges of cooking vessels for mounting the splatter protector thereon, wherein the diameter of the end opening defined by the first end portion is greater than the diameter of the end opening defined by the second end portion. A kit including the splatter protector and a lid for covering at least one of the respective end openings defined by the first and second end portions of the splatter protector.

20 Claims, 12 Drawing Sheets

SPLATTER PROTECTOR

FIELD

The present application generally relates to splatter protectors, and more particularly, to a splatter protector for cooking vessels.

BACKGROUND

Splatter protectors are often used to reduce or eliminate splatter in a cooking area that can occur when cooking food. A number of such splatter protectors work only with a cooking vessel of a particular size. In the case of a kitchen that has cooking vessels of various sizes, a different splatter protector may be required for each cooking vessel. This can result in a kitchen cluttered with splatter protectors.

In addition, some splatter protectors sit in cooking vessels. These splatter protectors touch the food that is being cooked, which may result in the food becoming contaminated. Moreover, splatter protectors that sit in cooking vessels may not be suitable for use with sauces.

It would be advantageous to provide for a space saving splatter protector that reduces the clutter in kitchens and has enhanced safety and suitability for use with sauces.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
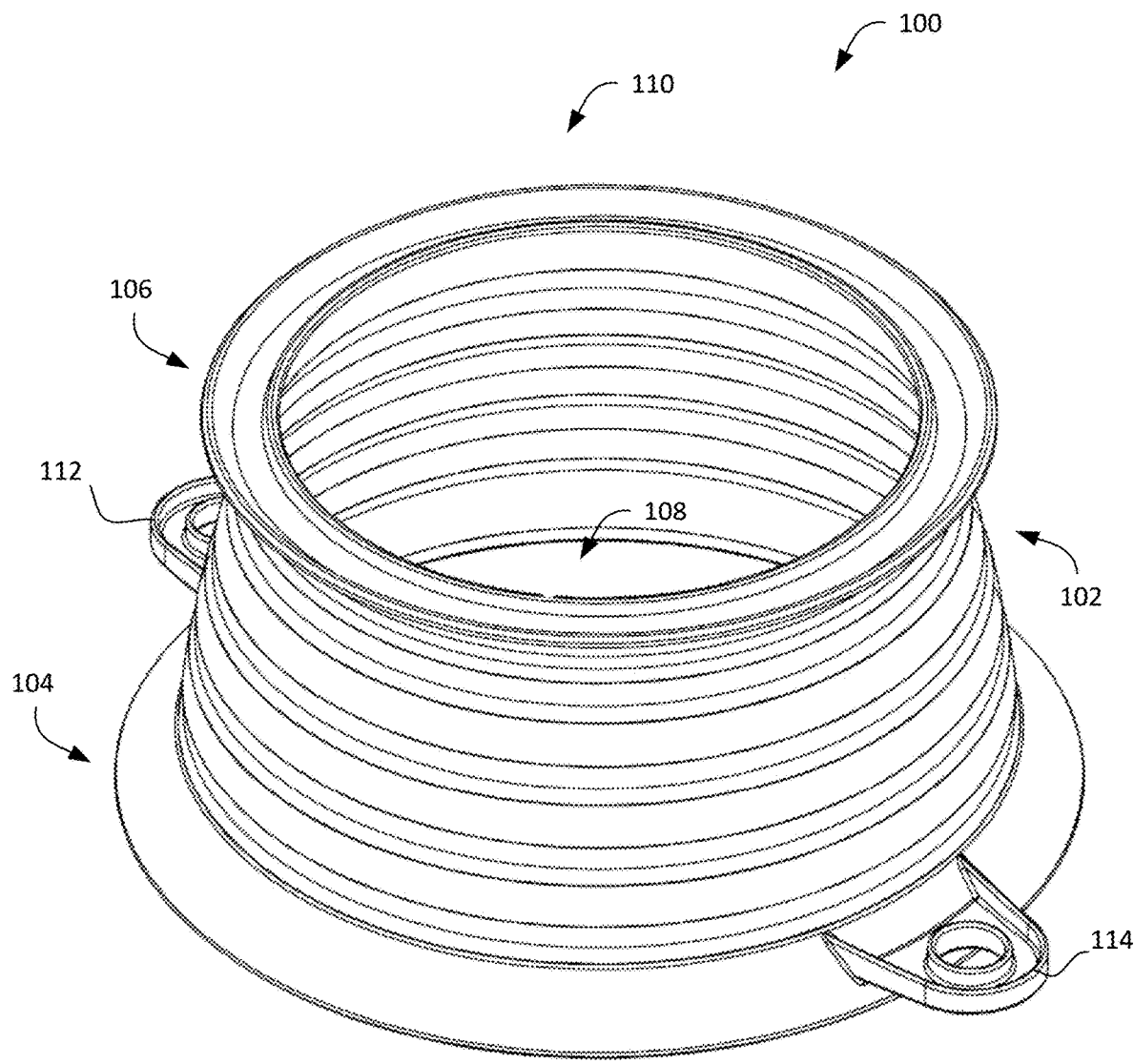
FIG. 1 shows a side perspective view of an example splatter protector.

In a first aspect, the present application describes a splatter protector including a hollow body having oppositely-directed first and second end portions. Each of the end portions may define a respective substantially circular end opening having an annular lip along the circumference thereof for engaging with upper edges of cooking vessels for mounting the splatter protector thereon, wherein the diameter of the end opening defined by the first end portion is greater than the diameter of the end opening defined by the second end portion.

In some implementations, each respective annular lip cooperates with a respective outer edge to form a channel for receiving upper edges of the cooking vessels.

In some implementations, the annular lips are flush with an inner surface of the body.

In some implementations, the first and second end portions have substantially the same shape.

In some implementations, the diameter of the end opening defined by the first end portion is about 5 centimeters greater than the diameter of the end opening defined by the second end portion.

In some implementations, the diameter of one of the end openings is about 25 centimeters.

In some implementations, the body is movable between an expanded configuration, a semi-collapsed configuration and a compact configuration.

In some implementations, the splatter protector may further include a plurality of annular grooves defined in the body, wherein the body is movable between the expanded configuration, the semi-collapsed configuration, and the compact configuration by folding and unfolding the body, the plurality of grooves facilitating the folding and unfolding of the body.

In some implementations, the exterior surface of the body defines a substantially frustoconical shape in the expanded configuration and the semi-collapsed configuration.

In some implementations, the body includes a plurality of sections pivotable relative to each other about a plurality of grooves, the plurality of sections for collapsing the body.

In some implementations, when the body is in an expanded configuration, the plurality of sections are oriented away from each other.

In some implementations, the splatter protector may further include a handle disposed proximate the first end portion.

In some implementations, the splatter protector may further include a pair of opposed handles disposed proximate the first end portion.

In some implementations, the splatter protector is of one-piece construction.

In some implementations, the first and second end portions are capable of collecting condensation.

In another aspect, the present application describes a kit. The kit may include the splatter protector and a lid for covering at least one of the end opening defined by the first end portion and the end opening defined by the second end portion of the splatter protector.

In some implementations, the lid includes a groove for receiving the annular lip of one of the first and second end portions of the splatter protector.

In some implementations, when the lid is seated on the annular lip of one of the first and second end portions, there is a gap between the lid and the outer edge of the splatter protector corresponding to the annular lip on which the lid is seated.

In some implementations, when the lid covers one of the end openings of the splatter protector, the splatter protector is capable of collecting condensation formed at the lid.

In some implementations, when the lid is seated on one of the end openings of the splatter protector, the end portion on which the lid is seated is capable of collecting condensation formed at the lid.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In one aspect, the present application provides for an invertible splatter protector that may be used with two differently sized cooking vessels. Examples of cooking vessels include pans, frying pans, saucepans, saute pans, sauciers, skillets, woks, pots, saucepots, stockpots and other cookware that are typically used to cook, fry or boil food on a stovetop.

A cooking vessel may have a flat, circular bottom and a cylindrical wall that extends upwardly from the bottom. The bottom and the wall may define an interior space for holding food items. The wall of the cooking vessel may be flared or tapered such that the wall widens progressively away from the bottom. The wall may have an upper edge, sometimes referred to as an overcook edge, on which a lid may lie. The upper edge defines an opening, sometimes referred to as a mouth, for accessing the interior space of the cooking vessel. In some examples, the upper edge is a rolled lip.

In the cooking industry, cooking vessels are often sized according to the diameter of their mouth. Popular sizes include diameters of about 20, 25 and 30 centimeters (about 8, 10 and 12 inches, respectively). Cooks often use cooking vessels of different types and sizes. For example, a cook may use a 20 centimeter frying pan for searing tuna and a 25 centimeter pot for cooking pasta sauce.

Reference is now made to FIG. 1, which shows a side perspective view of an example splatter protector. The splatter protector 100 has a hollow body 102 for reducing or blocking splatter generated by cooking vessels. The body 102 has oppositely-directed first and second end portions 104 and 106 that define respective end openings 108 and 110. The end openings 108 and 110 are substantially circular. The respective end portions 104 and 106 are for engaging with the upper edges of cooking vessels (not shown) for mounting the splatter protector 100 on the upper edges.

In this example, the splatter protector 100 includes a pair of opposed handles 112 and 114. The handles 112 and 114 are disposed proximate the first end portion 104. More particularly, in the example embodiment shown in FIG. 1, the handles 112 and 114 are attached to the first end portion 104. In some embodiments, the handles 112 and 114 may be attached to the body 102. The handles 112 and 114 may be permanently attached and may be used for carrying, flipping or inverting the splatter protector 100. In some embodiments, there is only a single handle 112.

Figure 2:
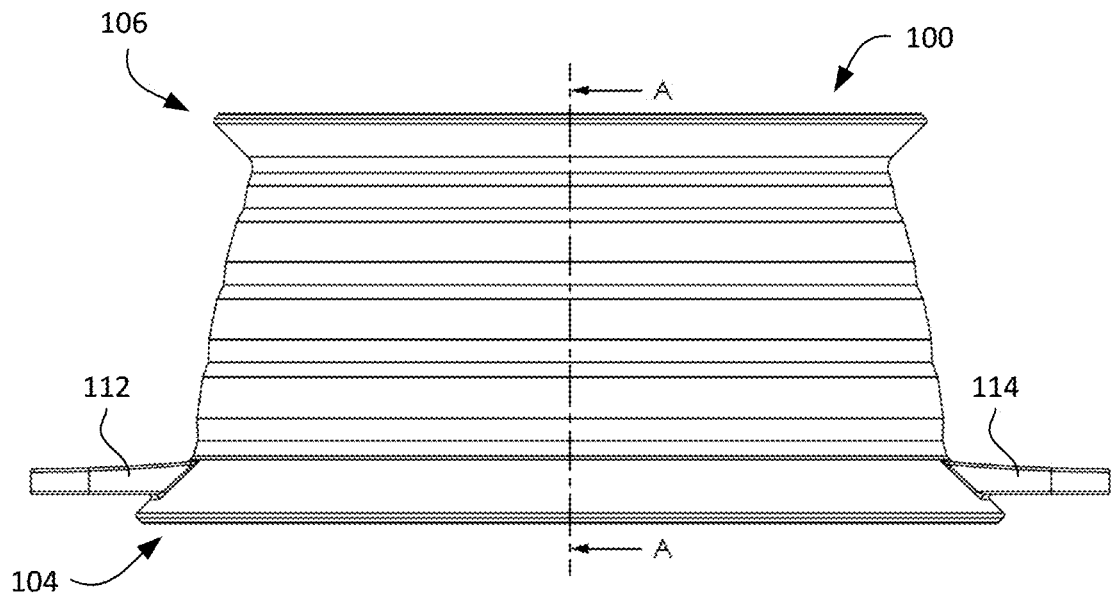
FIG. 2 shows a side elevation view of the example splatter protector of FIG. 1.

Reference is now made to FIG. 2, which shows a side elevation view of the example splatter protector 100 of FIG. 1. The body 102 of the splatter protector 100 may be tapered such that the body 102 narrows progressively from away from the first end portion 104 and towards the second end portion 106.

Figure 3:
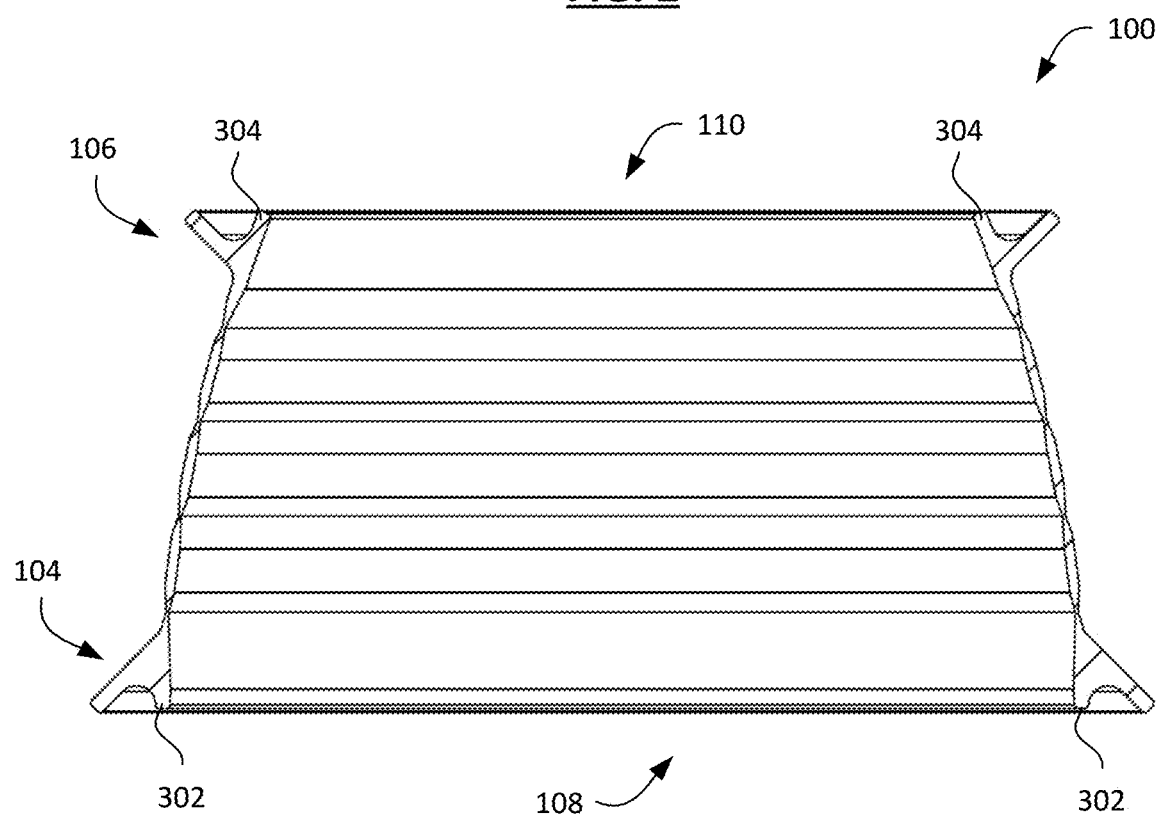
FIG. 3 shows a cross-sectional view of the example splatter protector of FIG. 2 taken generally along line A-A of FIG. 2.

Reference is now made to FIG. 3, which shows a cross-sectional view of the example splatter protector of FIG. 2 taken generally along line A-A of FIG. 2. The end openings 108 and 110 of the splatter protector 100 have respective annular lips 302 and 304 along the circumference thereof for engaging with upper edges of respective cooking vessels for mounting the splatter protector thereon. In the example shown, the diameter of the end opening 108 defined by the first end portion 104 is greater than the diameter of the end opening 110 defined by the second end portion 106. Conveniently, in this way, the splatter protector may be used with two cooking vessels having substantially different respective sizes.

The end openings 108 and 110 may be sized to correspond to popular diameters of cooking vessels. In some embodiments, the diameter of the end opening 108 defined by the first end portion 104 is about 5 centimeters (about 2 inches) greater than the diameter of the end opening 110 defined by the second end portion 106. In some embodiments, the diameter of one of the end openings 108 and 110 is about 25 centimeters (about 10 inches).

Figure 4:
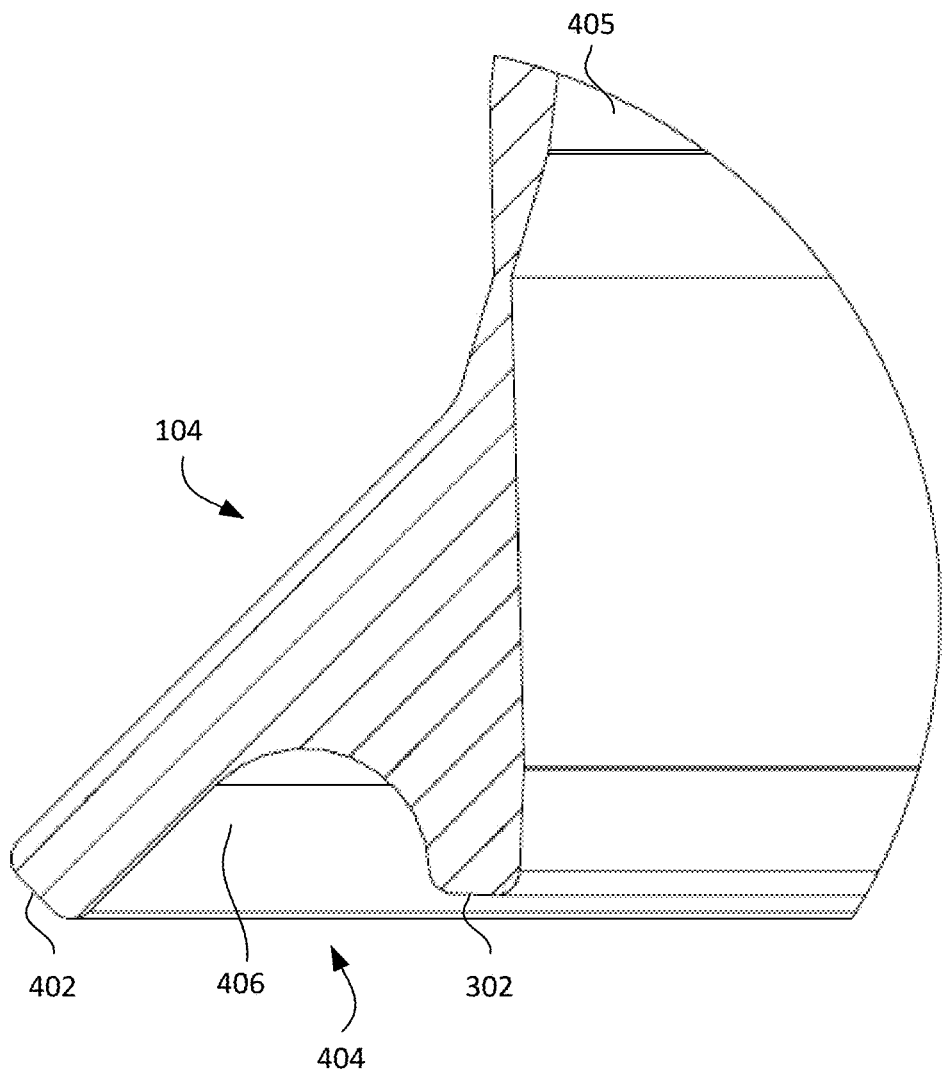
FIG. 4 shows an enlarged, cross-sectional view of an end portion of the example splatter protector of FIG. 3.

Reference is now made to FIG. 4, which shows an enlarged, cross-sectional view of the first end portion 104 of the example splatter protector 100 of FIG. 3 configured to engage with a cooking vessel. The first end portion 104 includes an annular lip 302 that cooperates with a respective annular outer edge 402 to form a channel 404 for receiving upper edges of the cooking vessels.

The channel 404 may have any suitable shape for mounting the splatter protector 100 on a cooking vessel. The inner surface 406 of the channel 404 may be shaped to conform to the curvature of the upper edge of a cooking vessel. In some embodiments, the cross-section of the inner surface 406 may be U-shaped or shaped as an arch. When the first end portion 104 is seated on the upper edge of a cooking vessel, the upper edge of the cooking vessel may abut the inner surface 406 in one or more locations. For instance, the upper edge may abut the lip 302 and/or the edge 402.

The first end portion 104 may be configured to removeably seat the splatter protector 100 on a cooking vessel and, when seated on the cooking vessel, reduce or prevent slippage of the splatter protector off of the cooking vessel. In other words, the first end portion 104 may be configured to reduce the lateral movement or shifting of the splatter protector 100 when the first end portion 104 is mounted on a cooking vessel. In particular, the end portion 104 may be shaped to provide enhanced stability and balance of the splatter protector 100. In some embodiments, the end portion 104 may be configured to nest at least a portion of the upper edge of the vessel therein. In the example shown, the channel 404 may receive the upper edge of the cooking vessel. The lip 302 and the edge 402 may be shaped or oriented to reduce or prevent shifting and may cooperate with each other to reduce or prevent shifting of the splatter protector when mounted on the cooking vessel.

As shown in the example in FIG. 4, the lip 302 may be substantially flush with an inner surface 405 of the body 102. In other words, the lip 302 may be arranged in-line with an inner surface 405 of the body 102 or may form a continuous plane with the inner surface 405 of the body 102.

The edge 402 may extend from an exterior surface of the body 102 and may be oriented away from the second end portion 106. In the example shown in FIG. 4, the edge 402 protrudes from an exterior surface of the body 102 at about a 45 degree angle. In some embodiments, at least a portion of the edge 402 may be substantially parallel to the lip 302.

It will be appreciated that the second end portion 106 may have a shape and components that are substantially the same as that of the first end portion 104.

Figure 5:
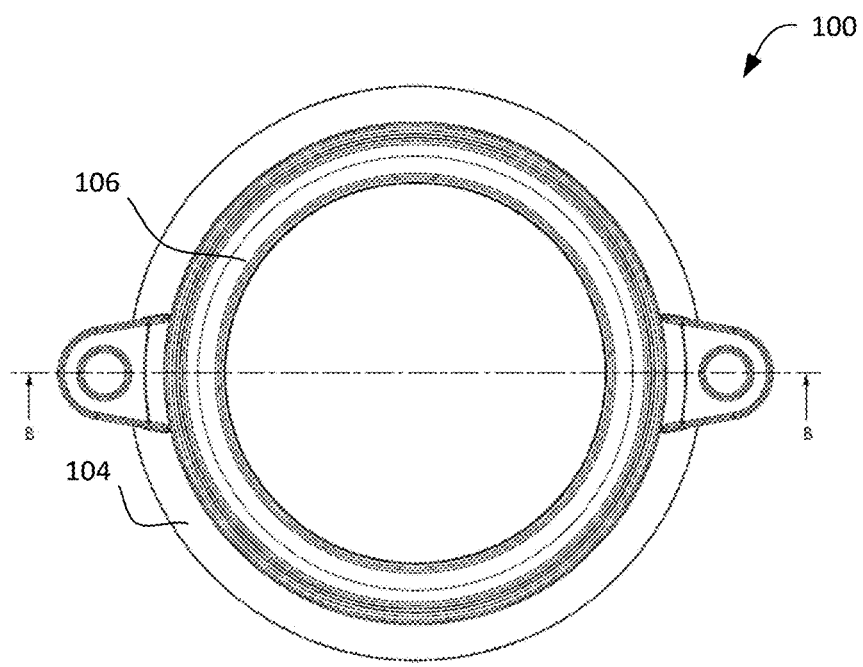
FIG. 5 shows a top plan view of the example splatter protector of FIG. 1, wherein the body of the splatter protector is in an expanded configuration.
Figure 6:
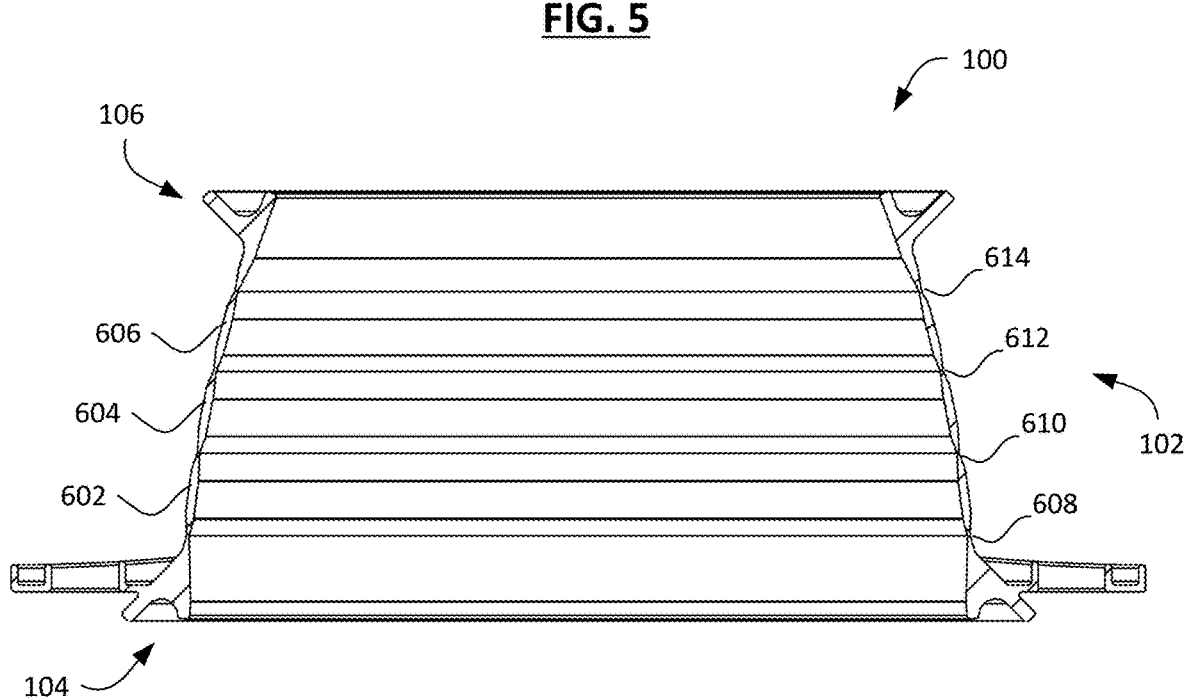
FIG. 6 shows a cross-sectional view of the example splatter protector of FIG. 5 taken generally along line B-B of FIG. 5.

Reference is now made to FIG. 5, which shows a top plan view of the example splatter protector 100 of FIG. 1, wherein the body 102 is in an expanded configuration. Reference is also now made to FIG. 6, which shows a cross-sectional view of the example splatter protector of FIG. 5 taken generally along line B-B of FIG. 5.

The body 102 is movable between the expanded configuration, a semi-collapsed configuration and a compact configuration by folding and unfolding the body 102. The body 102 includes a plurality of sections 602, 604, and 606 that are pivotable relative to each other for folding and unfolding the body 102. A first section 602 is connected to the first end portion 104 and to a second section 604. The second section 604 is connected to a third section 606. The third section 606 is connected to the second end portion 106.

The plurality of sections 602, 604, and 606 are sometimes referred to as a wall. The wall may be thinner at the connections between the sections 602, 604, and 606 and the first and second end portions 104 and 106 to allow for the folds. In this way, a plurality of annular grooves 608, 610, 612 and 614 may be defined by the body 102. In some embodiments, the grooves may be located in the exterior and/or interior of the body 102. In the example shown, a first groove 608 is defined between the first end portion 104 and the first section 602, a second groove 610 is defined between the first section 602 and the second section 604, a third groove 612 is defined between the second section 604 and a third section 606, and a fourth groove 614 is defined between the second end portion 106 and the third section 606. The sections and grooves facilitate the folding and unfolding of the body 102. The plurality of sections 602, 604, and 606 may be pivotable at or about the plurality of grooves 608, 610, 612 and 614.

When the body 102 is in the expanded configuration, the plurality of sections 602, 604 and 606 are in an unfolded arrangement. In other words, the sections 602, 604 and 606 are stacked directly on top of each other and/or one of the first and second end portions 104 and 106. Put another way, the plurality of sections 602, 604 and 606 are oriented away from each other or are arranged in-line with each other.

Figure 7:
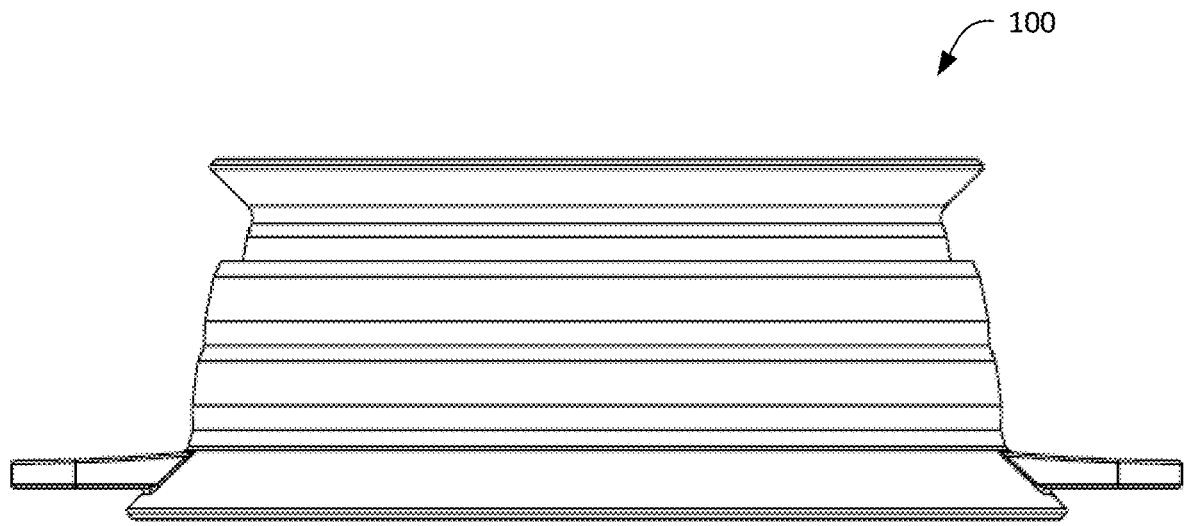
FIG. 7 shows a side perspective view of the example splatter protector of FIG. 1, wherein the example splatter protector is inverted and in a semi-collapsed configuration.

Reference is now made to FIG. 7, which shows a side perspective view of the example splatter protector 100 of FIG. 1, wherein the example splatter protector is inverted. In other words, the example splatter protector 100 of FIG. 1 is flipped upside down. In FIG. 7, the body 102 is in a semi-collapsed configuration. In both the expanded configuration and the semi-collapsed configuration, the exterior surface of the body 102 may define a substantially frusto-conical shape. However, in the semi-collapsed configuration, the distance between the first and second end portions 104 and 106 may be less than it is in the expanded configuration, and in the compact configuration, the distance between the first and second end portions 104 and 106 may be less than it is in the semi-collapsed configuration. In other words, the height of the splatter protector 100 is less in the semi-collapsed configuration than it is in the extended configuration, and is less in the compact configuration than it is in the semi-collapsed configuration.

Figure 8:
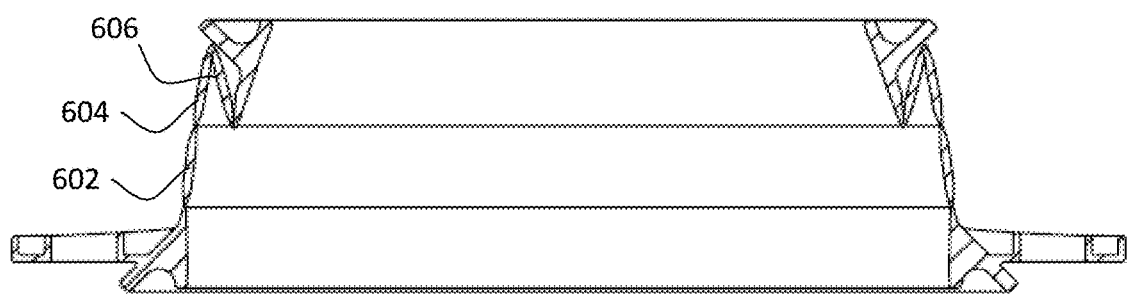
FIG. 8 shows a cross-sectional view of the example splatter protector of FIG. 7 in a semi-collapsed configuration.

Reference is now made to FIG. 8, which shows a cross-sectional view of the example splatter protector of FIG. 7 in a semi-collapsed configuration. In the semi-collapsed configuration, at least one of the plurality of sections 602, 604 and 606 may be in a folded orientation. In other words, at least one of the sections 602, 604 and 606 may be folded or pivoted into the interior of the body 102 towards another one of the plurality of sections 602, 604 and 606 or one of the end portions 104 and 106. Similarly, in the semi-collapsed configuration, at least one of the plurality of sections 602, 604 and 606 may be in an unfolded arrangement. In other words, at least one of the sections 602, 604 and 606 may be oriented away from another one of the sections 602, 604 and 606 or may be arranged in-line with another one of the sections 602, 604 and 606.

In the example semi-collapsed configuration shown in FIG. 8, the section 606 is folded into the interior of the body 102 towards the section 604. The folded section 606 may be oriented adjacent and substantially parallel to the extended or unfolded section 604, and may lie in a plane that is substantially parallel to the plane in which the sections 602 and 604 lie. The sections 602 and 604 may be oriented in substantially the same plane.

Figure 9:
FIG. 9 shows a side perspective view of the example splatter protector of FIG. 1 in a compact configuration.

Reference is now made to FIG. 9, which shows a side perspective view of the example splatter protector of FIG. 1 in a compact configuration.

The handles 112 and 114 may be disposed proximate the first end portion 104 rather than proximate the second end portion 106, at least a portion of which may be surrounded by the first end portion 104 and/or one or more of the plurality of sections when the splatter protector 100 is in the semi-collapsed or compact configurations. Conveniently, in this way, the handles 112 and 114 may not be in the way when collapsing the splatter protector 100.

Figure 10:
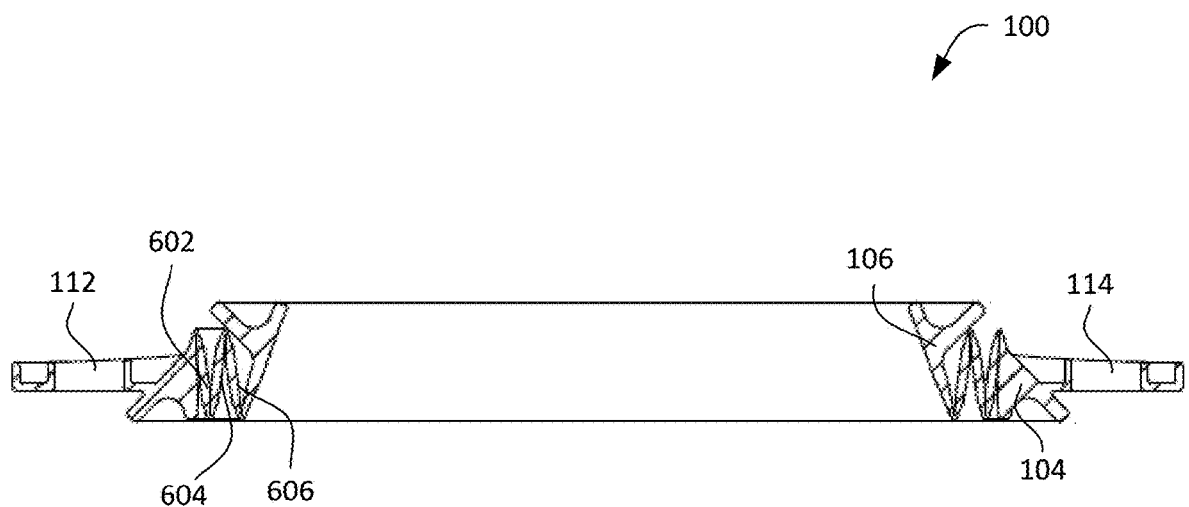
FIG. 10 shows a cross-sectional view of the example splatter protector of FIG. 9 in a compact configuration.

Reference is now made to FIG. 10, which shows a side perspective view of the example splatter protector of FIG. 1 in a compact configuration. In the compact configuration, the sections 602, 604 and 606 may be folded or rotated into the interior of the body 102. In other words, each of the sections 602, 604 and 606 may be in a folded or unstacked orientation and may be oriented towards another one of the plurality of sections 602, 604 and 606 and/or one of the end portions 104 and 106.

In the example compact configuration shown in FIG. 10, the sections 602, 604 and 606 are in a folded arrangement and may be substantially parallel to each other, and may lie in substantially parallel respective planes. At least a portion of the second end portion 106 is surrounded by the first end portion 104 and the plurality of sections 602, 604 and 606. In this example configuration, the height of the splatter protector 100 is substantially the same as the height of the second end portion 106.

In some embodiments, the splatter protector 100 includes an annular condensate trough (not shown) disposed exteriorly on the body 102 or wall. The condensate trough may be disposed proximate, on or adjacent to one of the end portions 104 and 106. In some embodiments, the condensate trough is disposed proximate to the end portion defining the larger diameter opening. The opening of the condensate trough may be oriented towards and substantially parallel to one of the end portions 104 and 106. In embodiments where the trough is disposed proximate to the larger of the end portions 104 and 106, the opening of the trough may be oriented towards the end portion defining the smaller diameter opening.

Figure 11:
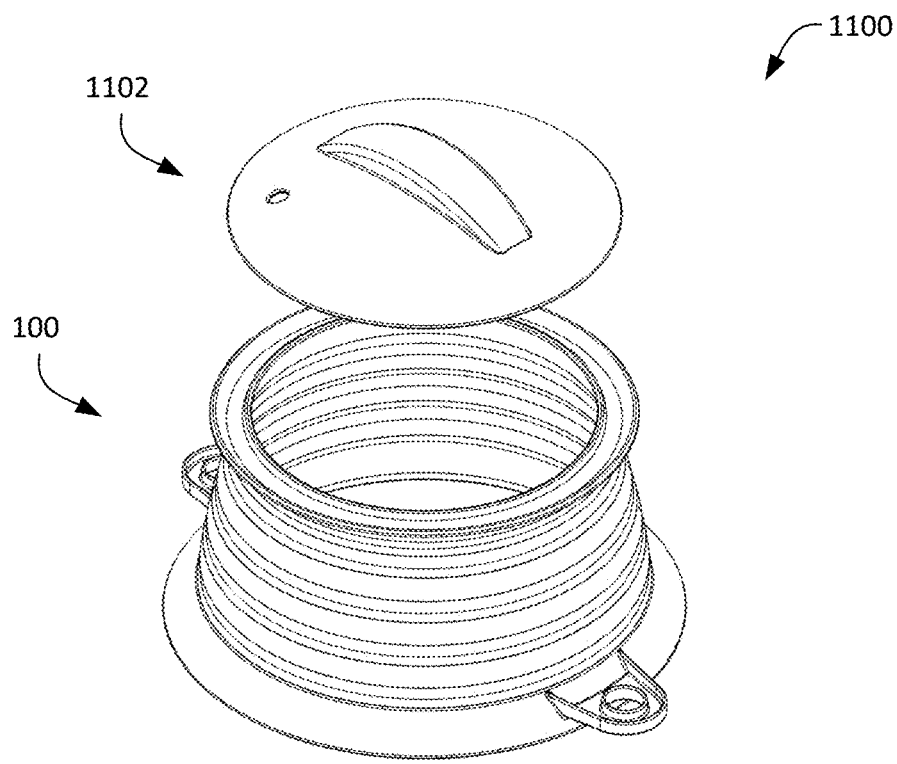
FIG. 11 shows a side perspective view of an example kit including an example lid and the example splatter protector of FIG. 1.

Reference is now made to FIG. 11, which shows a side perspective view of a kit 1100 including an example lid and the example splatter protector 100 of FIG. 1. In some embodiments, the lid 1102 may be used to cover at least one of the first and second end openings of the splatter protector 100.

Figure 12:
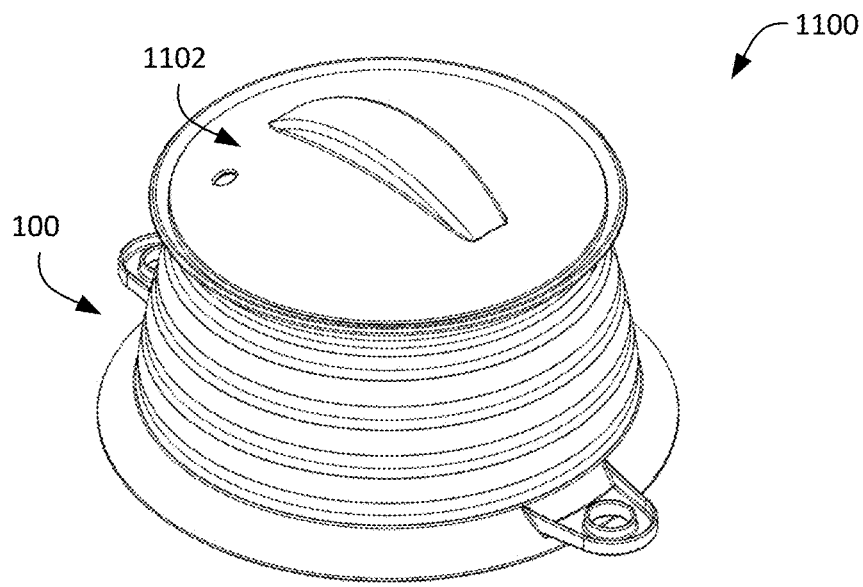
FIG. 12 shows a side perspective view of the kit of FIG. 11 with the example lid seated on the example splatter protector.

Reference is now made to FIG. 12, which shows a side perspective view of the kit of FIG. 11 with the example lid 1102 seated on the example splatter protector 100.

The lid 1102 may be seated on the splatter protector 100 when the splatter protector 100 is in either the expanded or semi-collapsed configurations. When the splatter protector 100 is in the expanded or semi-collapsed configuration, the splatter protector 100 should be capable of supporting the weight of the lid 1102 without collapsing. In other words, when the lid 1102 is seated on one of the first or second end portions of the splatter protector 100, the weight of the lid 1102 should not cause the splatter protector 100 to move from an expanded configuration to a semi-collapsed or from a semi-collapsed configuration to a compact configuration. The force that is required to partially or fully collapse the splatter protector 100 should be greater than the force exerted on the splatter protector 100 by the lid 1102 seated on the splatter protector 100.

Figure 13:
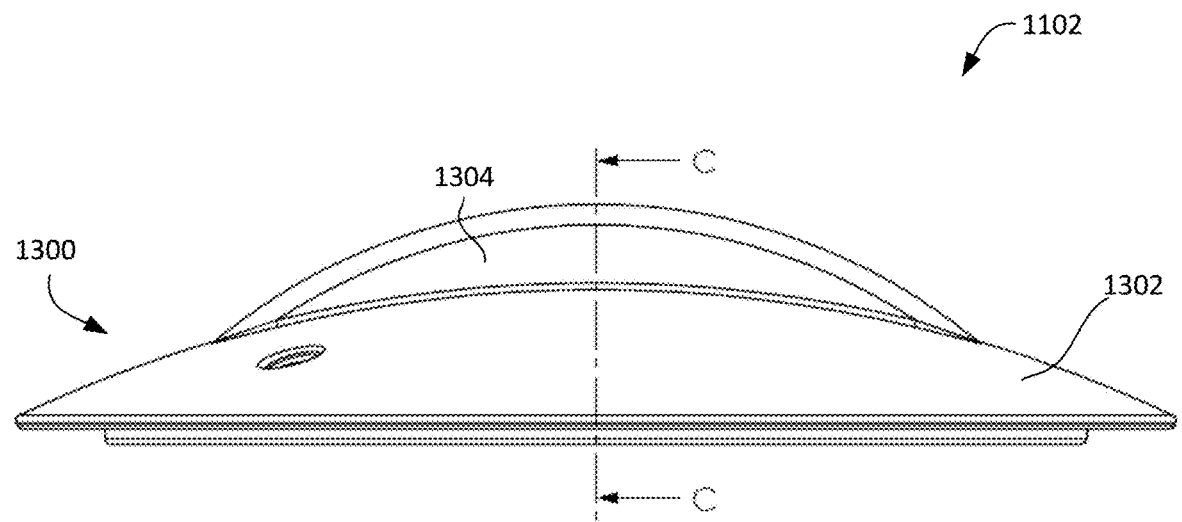
FIG. 13 shows a side elevation view of the example lid of FIG. 11.
Figure 14:
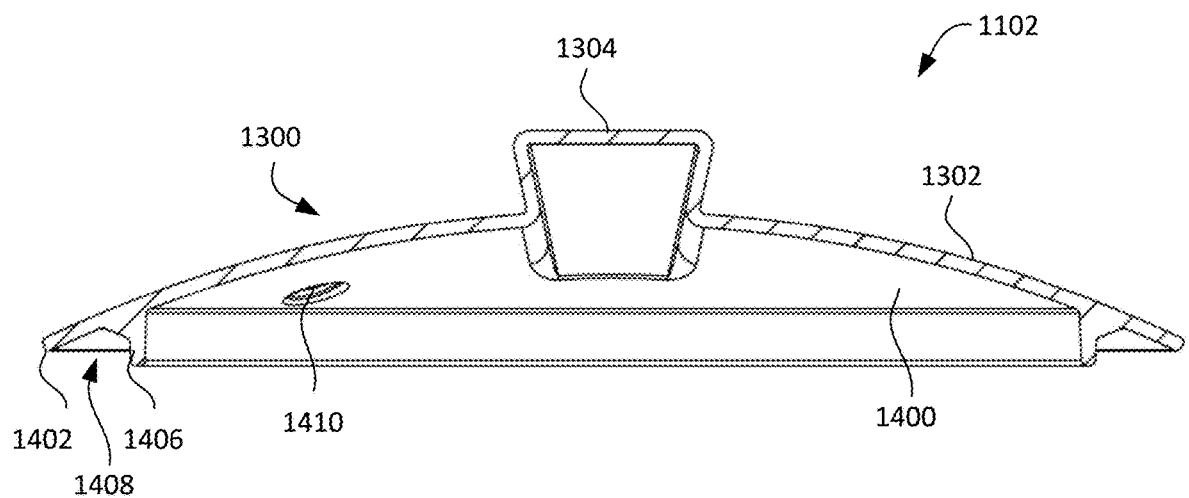
FIG. 14 shows a cross-sectional view of the example lid of FIG. 13 taken generally along line C-C of FIG. 13.

Reference is now made to FIG. 13, which shows a side elevation view of the example lid 1102 of FIG. 11. The example lid 1102 includes a body 1300 having an upper surface 1302 and a lower surface 1400 as shown in FIG. 14. The body 1300 may have any suitable shape. For example, the body 1300 may be generally curved or substantially flat, circular, planar, or disc-shaped.

The lid 1102 may include a handle 1304 for lifting or carrying the lid 1102. The handle 1304 may be disposed on the upper surface 1302 of the body 1300.

Reference is now made to FIG. 14, which shows a cross-sectional view of the example lid 1102 of FIG. 13 taken generally along line C-C of FIG. 13. As shown in the example in FIG. 14, the lid 1102 includes an annular outer edge 1402 where the upper surface 1302 ends.

The lid 1102 may also include a flange 1406 that extends from the lower surface. In some embodiments, the flange 1406 extends in a direction that is substantially perpendicular the body 1300 or to a plane defined by the outer edge 1402. The flange 1406 may facilitate centering the lid 1102 on the splatter protector 100.

The outer edge 1402 and flange 1406 may cooperate to define an annular groove 1408 for receiving the annular lip of a splatter protector.

As shown in the example in FIG. 14, the body 1300 may be curved. In some embodiments, the center of the body 1300 may curve away from the flange 1406 and the outer edge 1402 may curve towards the flange 1406.

The lid 1102 may also include a ventilation opening 1410, sometimes referred to as a vent hole, formed in the body 1300 for facilitating the passage of steam through the lid 1102. The ventilation opening 1410 may be disposed in the portion of the body 1300 that is bounded by the flange 1406.

Figure 15:
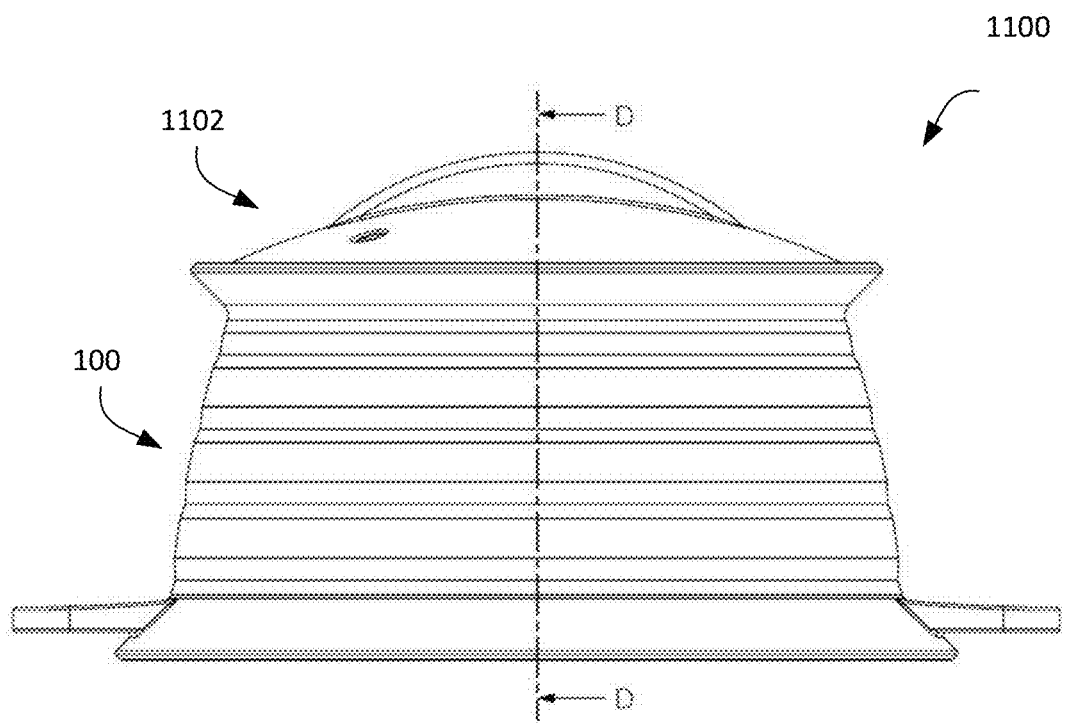
FIG. 15 shows a side perspective view of the kit of FIG. 12.
Figure 16:
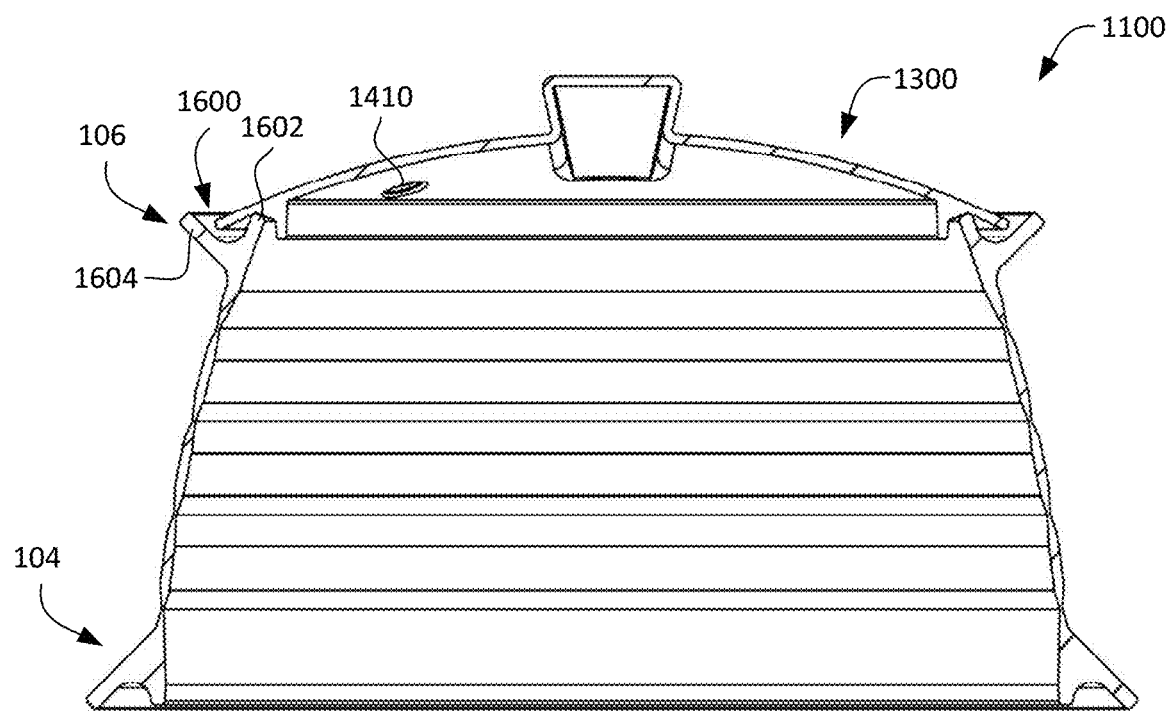
FIG. 16 shows a cross-sectional view of the kit of FIG. 15 taken generally along line D-D of FIG. 15.

Reference is now made to FIG. 15, which shows a side perspective view of the kit of FIG. 12, and to FIG. 16, which shows a cross-sectional view of the kit of FIG. 15 taken generally along line D-D of FIG. 15. In this example, the lid 1102 is seated on the second end portion 106 of the splatter protector 100 when the splatter protector 100 is in the expanded configuration. In some embodiments, the lid 1102 may be seated on the second end portion 106 when the splatter protector 100 is in the expanded configuration and/or in the semi-collapsed configuration.

When the splatter protector 100 is mounted on a cooking vessel and the lid 1102 is seated on the second end portion 106 of the splatter protector 100, the lid 1102 may block at least some splatter travelling through the second end opening 110 and may trap at least some steam and heat inside the splatter protector 100 that is generated by food cooking in the cooking vessel.

At least some steam and heat may escape via the ventilation opening 1410. The escaped steam may form condensation at the upper surface 1302 of the lid 1102. The condensation may drip from the upper surface 1302 at the outer edge 1402 of the lid 1102 and into the channel 1600 formed in the second end portion 106, which acts as a trough for capturing condensation. In this way, the splatter protector 100, the second end portion 106 on which the lid 1102 is seated, and the channel 1600, are capable of collecting and holding at least some condensation formed at the lid 1102.

The example lid 1102 is sized to cover the second end opening 110 of the splatter protector 100 when resting on the second end portion 106. In particular, the diameter of the lid 1102 is greater than the diameter of the second end opening 110, and the annular lip 1602 of the second end portion 106 may fit into and be received by the annular groove 1408 of the lid 1102.

The example lid 1102 may be configured to rest on the annular lip 1602 of the second end portion 106. When the lid 1102 is seated on or rests on the annular lip 1602, the annular lip 1602 may abut the body 1300 of the lid 1102 and may not contact the outer edge 1604 of the second end portion 106. In other words, when seated, the lid 1102 may contact and extend past or over the annular lip 1602 and may not contact, extend to, extend past, or extend over the outer edge 1604 of the second end portion 106. Put another way, when the lid 1102 is seated on the annular lip 1602 of the second end portion 106, there may be a gap between the outer edge 1402 of the lid 1102 and the outer edge 1604 of the second end portion 106.

The flange 1406 may be sized to fit within the interior area defined by the annular lip 1602. In particular, the diameter of the annular lip 1602 may be greater than diameter of the flange 1406 such that when the lid 1102 is seated on the annular lip 1602, the annular lip 1602 surrounds the flange 1406. As shown in FIG. 16, there may be a gap between at least a portion of the flange 1406 and the annular lip 1602.

Figure 17:
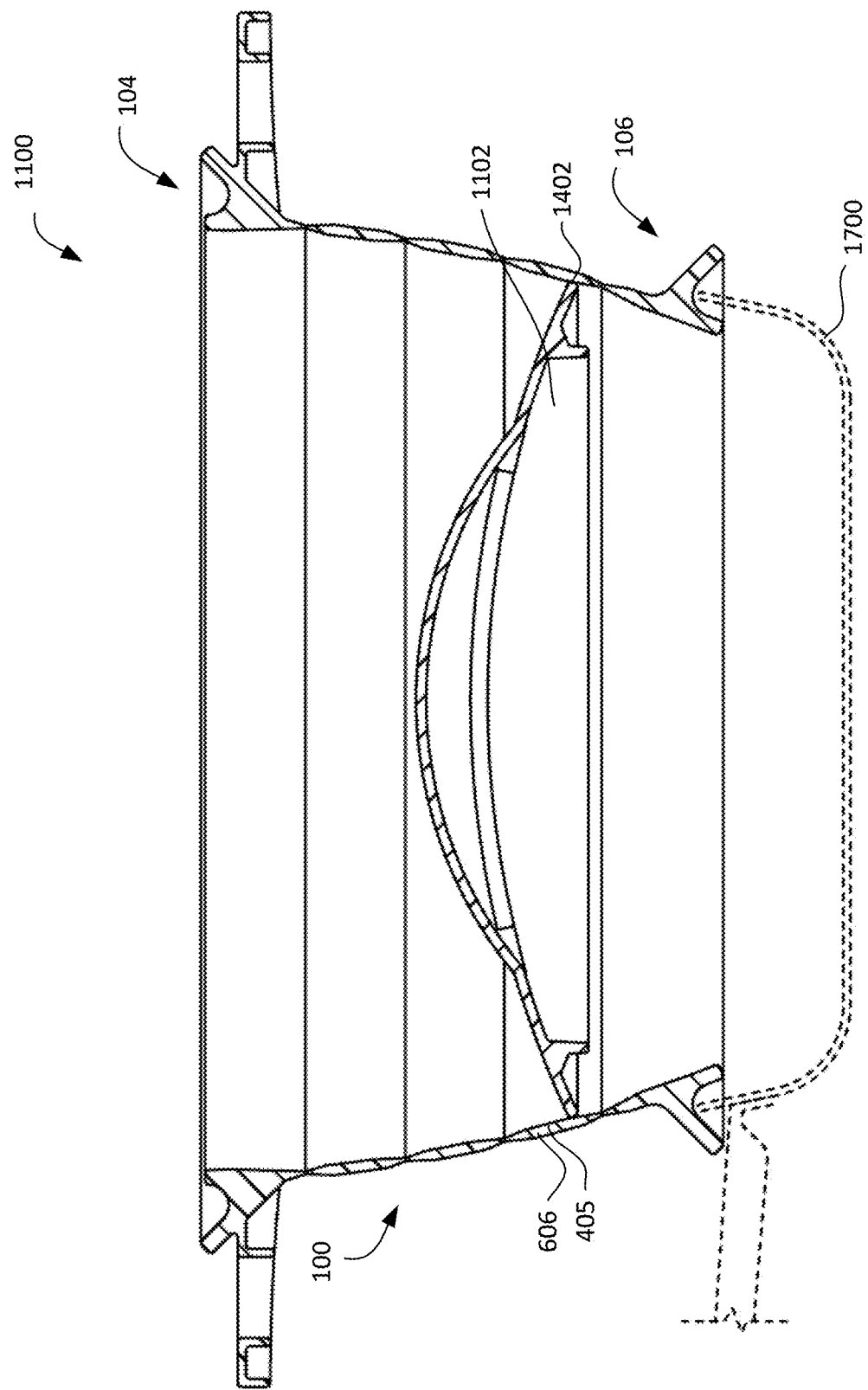
FIG. 17 shows a cross-sectional view of the kit of FIG. 11 with the lid resting on an inner surface of the splatter protector.

Reference is now made to FIG. 17, which shows a cross-sectional view of the kit of FIG. 11 with the lid 1102 resting on an inner surface 405 of the splatter protector 100. The lid 1102 may rest on the inner surface 405 of the splatter protector 100 when in the extended or semi-collapsed configurations. The inner surface 405 may correspond to the interior surface of the section 606 or the wall of the body 102. In some embodiments, the lid 1102 may rest on an interior surface of the sections 602 or 604, or in an interior groove defined by one or more of the sections 602, 604 and 606 and the second end portion 106.

As shown in FIG. 17, when the second end portion of the splatter protector 100 is mounted on a cooking vessel 1700, the larger, first end opening 108 of the splatter protector 100 may be positioned generally above the smaller, second end opening 110 of the splatter protector 100. The lid 1102 may be sized for covering the second end opening 110, as shown for example in FIG. 12, and may be insertable into the interior of the splatter protector 100 through the first end opening 108. The splatter protector 100 may be configured to receive the lid 1102 via the first end opening 108 and support the lid 1102 on an interior surface of the splatter protector. In this example, the diameter of the lid 1102, and particularly the outer edge 1402 of the lid 1102, may be greater than the diameter of the smaller second end opening 110 and less than the diameter of the larger first end opening 108. The outer edge 1402 of the lid 1102 may abut and rest on an inner surface 405 of the wall or body 102 of the splatter protector 100.

In this way, the same lid 1102 may be used to cover the second end opening 110 when the splatter protector 100 is oriented as shown in FIG. 12 or is flipped as shown in FIG. 17.

In some embodiments, the splatter protector 100 may be implemented as part of a kit that includes a lid (not shown) that is sized for resting on the first end portion 104 and covering the first end opening 108 of the splatter protector 100. The lid may have a shape and components that are substantially the same as that of the lid 1102. The lid may be seated on the first end portion 104 in a similar fashion as described above in relation to the lid 1102 being seated on the second end portion 106. In particular, the diameter of the lid may be greater than the diameter of the first end opening 108, and the annular lip 1602 of the first end portion 104 may fit into and be received by an annular groove of the lid.

The described splatter protector may also be implemented as a part of a kit that includes a cooking utensil (not shown). The cooking utensil may be a utensil for cooking purposes, including stirring, agitating or flipping food located in the cooking vessel when the splatter protector is seated on the cooking vessel in at least one of the extended or semi-collapsed configurations. In some embodiments, the utensil includes a handle and a head extending from an end of the handle. The head may be, for example, spoon, whisk, spatula or claw shaped. In some embodiments, the utensil is a tong having two handles, with each handle having a claw or spoon shaped head.

The utensil handle may have a shaft and a grip portion. The shaft connects the head to the grip portion. A first end of the shaft may extend from the head and a second end of the shaft may extend from the grip portion, thereby connecting the head to the grip portion. The shaft and grip portion may be rigid, substantially straight, solid or hollow, and have any suitable shape, including that of a rod, tube or flat bar. The grip portion may have a shape, contour and length that is suitable for being gripped by a human hand.

The utensil may be configured to facilitate stirring food located in the interior of the cooking vessel even when the splatter protector is seated on the cooking vessel. Accordingly, the length of the utensil, and in particular the combined length of the shaft and the head, may be greater than the distance between the first and second openings of the splatter protector in order to allow the utensil to reach an interior cooking surface of the cooking vessel while the handle is disposed exterior to splatter protector.

In some implementations, the shaft and grip portion are configured to define an angle between. Where the handle is of one piece construction, the angle may be formed by a bend in the handle between the shaft and the grip portion. The angle may be in the range of between about 90 degrees to about 135 degrees, for example. In some embodiments where the angle is 90 degrees, the utensil may be referred to as a right-angled spoon, whisk, spatula or tong, as the case may be, or more generally as an angled or right-angled utensil.

Figure 18:
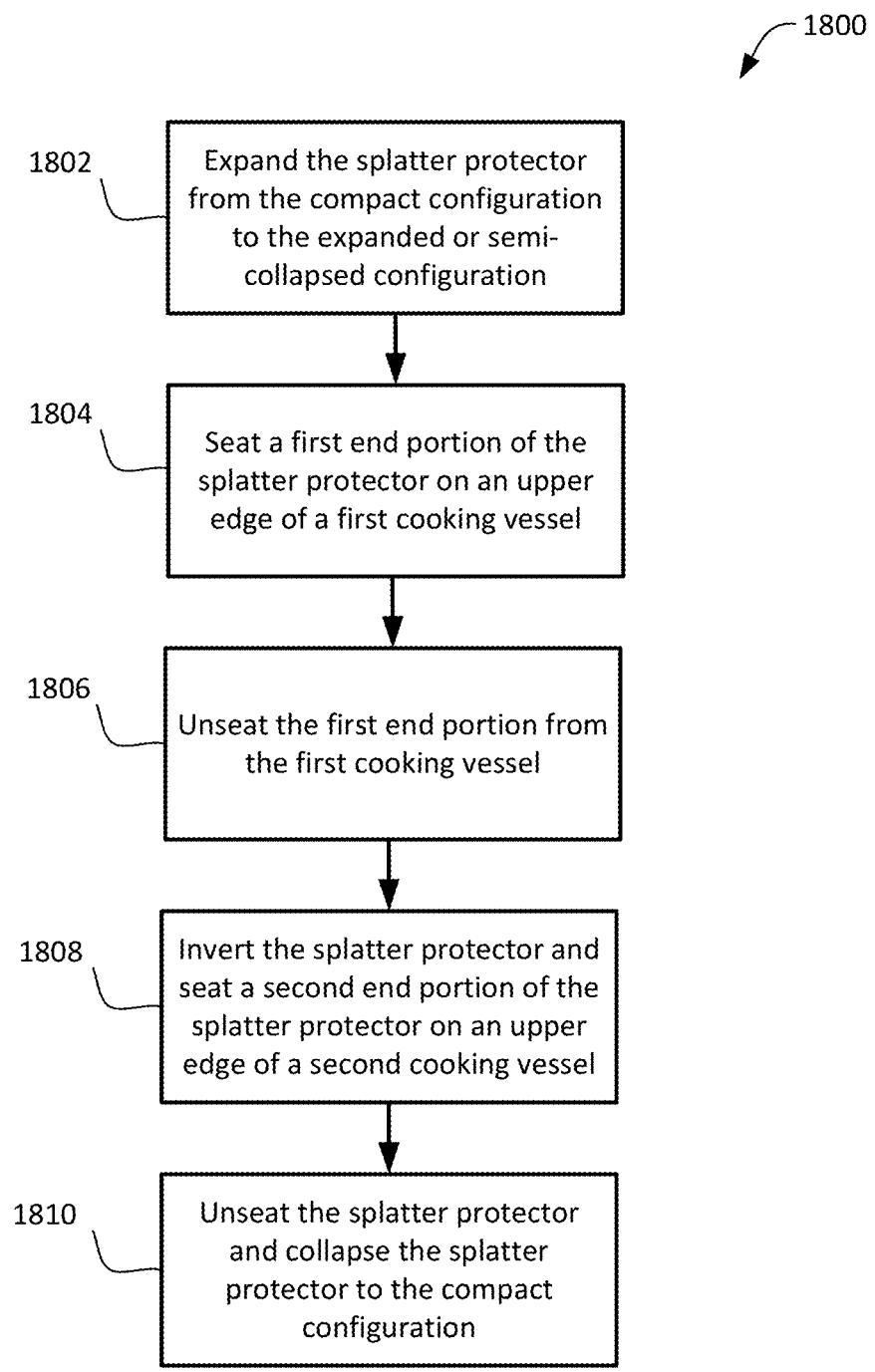
FIG. 18 shows a flowchart of an example method of using a splatter protector with cooking vessels of two different sizes.

Reference is now made to FIG. 18, which shows a flowchart of an example method 1800 of using a splatter protector with cooking vessels of two different sizes. In this example method 1800, the described operations are carried out by the example kit 1100 of FIG. 11. The described operations may be carried out, for example, in the context of a human using the kit when cooking food. When the kit is not in use, it may be stored in a kitchen cupboard or drawer with the splatter protector in the compact confirmation.

In operation 1802, the splatter protector is expanded from the compact configuration to either the semi-collapsed or expanded configuration. This may be carried out by a human applying a tensile force to the first and second end portions of the splatter protector.

Figure 19:
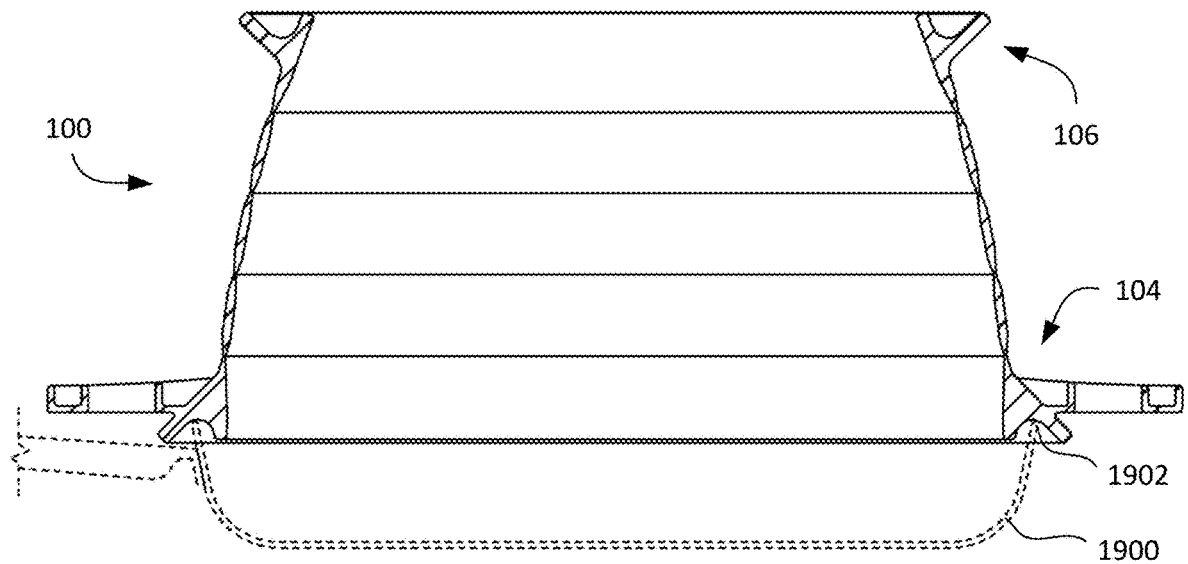
FIG. 19 shows a cross-sectional view of the example splatter protector of FIG. 6 with the splatter protector mounted on a cooking vessel.

In operation 1804, the first end portion of the splatter protector is seated on an upper edge of a first cooking vessel. Reference is now made to FIG. 19, which shows an example of the first end portion 104 of the splatter protector 100 seated on the upper edge 1902 of a first cooking vessel 1900. The first cooking vessel 1900 may contain food that is heated and splashes. At least some of the splashes may be blocked by the inner surface of the splatter protector. The heated food may also generate steam that passes through the interior of the splatter protector and exits through the second end opening of the splatter protector.

In some embodiments, a lid, for example the lid 1102, may be placed on the second end portion 106 of the splatter protector 100 in order to cover the second end opening and to block at least some food that may splatter through the second end opening.

In operation 1806, the first end portion 104 of the splatter protector 100 is unseated from the first cooking vessel 1900. The lid may be removed from the splatter protector prior to or after unseating the splatter protector.

Figure 20:
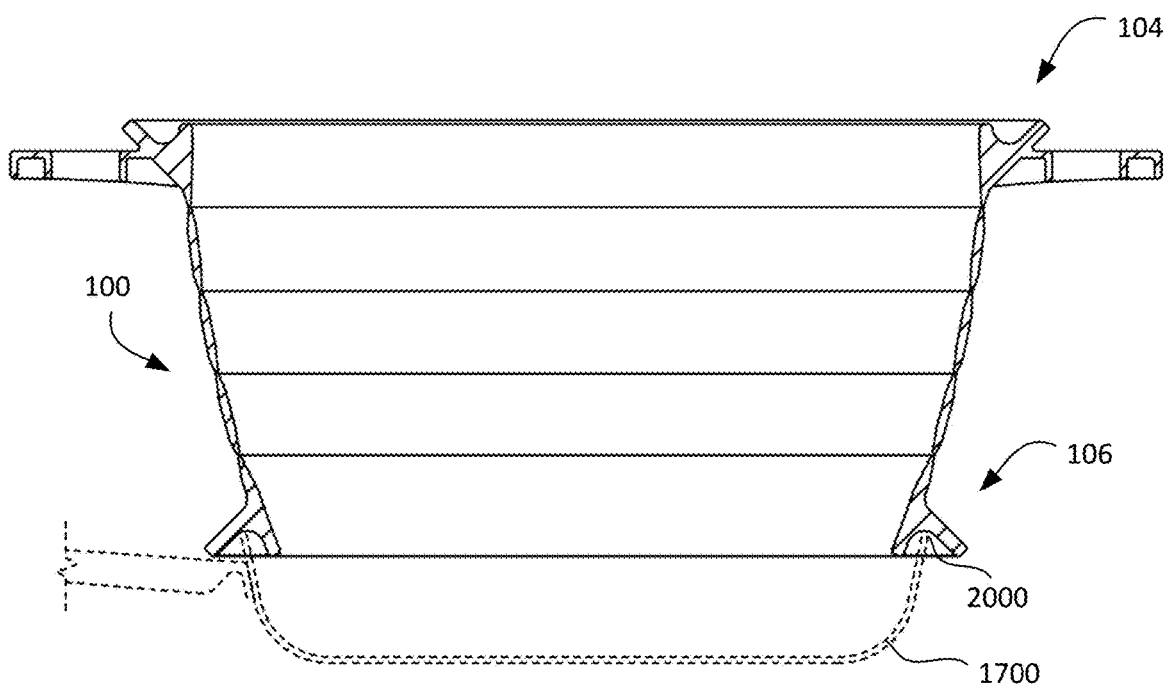
FIG. 20 shows a cross-sectional view of the example splatter protector of FIG. 19 with the splatter protector mounted in a flipped orientation on the cooking vessel.

In operation 1808, the splatter protector is inverted, or flipped upside down, and the second end portion of the splatter protector is seated on an upper edge of a second cooking vessel. Reference is now made to FIG. 20, which shows an example of the second end portion 106 of the splatter protector 100 seated on the upper edge 2000 of a cooking vessel 1700. In this example, the size of the mouth of the second cooking vessel 1700 is less than the size of the mouth of the first cooking vessel 1900.

In some embodiments, the lid 1102 may be seated inside of the splatter protector 100 as shown in FIG. 17 to cover the first end opening and to block at least some food that may splatter through the second end opening.

In operation 1810, the splatter protector 100 may be unseated from the second cooking vessel 1700 and the lid 1102 may be removed from the interior of the splatter protector 100. The splatter protector may be collapsed to the compact configuration by a human applying a compressive force to the first and second end portions of the splatter protector. The splatter protector may then be stored for later use.

It will be appreciated that it may be that some or all of the above-described operations of the various above-described example methods may be performed in orders other than those illustrated without varying the overall operation of those methods.

It will be understood that the components implementing the splatter protector, lid and cooking utensil may be made of any suitable material, including silicone and plastic. The material may be heat resistant, dishwasher safe, and/or food safe material. A heat resistant material may be capable of withstanding exposure to high temperatures or a hot surface without permanent and/or significant deformation or damage. For instance, an end portion of the splatter protector may be made of a heat resistant material that is capable of abutting a hot upper edge of a cooking vessel without deformation of the end portion. In some embodiments, the heat resistant material is capable of withstanding temperatures produced by a conventional electric stove top, which may range from about 120 degrees Celsius (248 degrees Fahrenheit) to about 200 degrees Celsius (392 degrees Fahrenheit), for example. A dishwasher safe material may be capable of being exposed to high temperatures of a dishwasher and detergents without damage to the material. A food safe material may include any suitable food-grade or other material that is non-toxic and may safely come into direct contact with food without contaminating the food with harmful materials.

Those skilled in the art will recognize that the described components may be implemented as separate components. It will be understood that the components implementing the splatter protector may be attached or secured to each other using standard techniques. The present application is not limited to particular fasteners, glues, or other such implementation details.

Those skilled in the art will also recognize that the splatter protector, lid and stirring utensil, and components thereof, may be of one-piece construction. For example, the splatter protector may be extruded, formed, molded, or printed as a unitary structure.

Certain adaptations and modifications of the described embodiments can be made. Therefore, the above discussed embodiments are considered to be illustrative and not restrictive.

What is claimed is:

1. A splatter protector comprising:
    a hollow body having:
        a plurality of sections pivotable relative to each other about a plurality of grooves, the plurality of sections for collapsing the hollow body; and
        oppositely-directed first and second end portions, each of the end portions defining a respective substantially circular end opening having an annular lip along the circumference thereof to form a channel for receiving upper edges of cooking vessels and seating the splatter protector on the upper edges of the cooking vessels,
    wherein the diameter of the end opening defined by the first end portion is greater than the diameter of the end opening defined by the second end portion.

2. The splatter protector of claim 1, wherein each respective annular lip cooperates with a respective outer edge to form the channel for receiving upper edges of the cooking vessels.

3. The splatter protector of claim 2, wherein the annular lips are flush with an inner surface of the hollow body.

4. The splatter protector of claim 1, wherein the first and second end portions have the same shape.

5. The splatter protector of claim 1, wherein the diameter of the end opening defined by the first end portion is about 5 centimeters greater than the diameter of the end opening defined by the second end portion.

6. The splatter protector of claim 5, wherein the diameter of one of the end openings is about 25 centimeters.

7. The splatter protector of claim 1, wherein the hollow body is movable between an expanded configuration, a semi-collapsed configuration and a compact configuration.

8. The splatter protector of claim 7, wherein the hollow body is movable between the expanded configuration, the semi-collapsed configuration, and the compact configuration by folding and unfolding the hollow body, the plurality of grooves facilitating the folding and unfolding of the hollow body.

9. The splatter protector of claim 7, wherein an exterior surface of the hollow body defines a substantially frusto-conical shape in the expanded configuration and the semi-collapsed configuration.

10. The splatter protector of claim 1, wherein when the hollow body is in an expanded configuration, the plurality of sections are oriented away from each other.

11. The splatter protector of claim 1, further comprising a handle disposed proximate the first end portion.

12. The splatter protector of claim 1, further comprising a pair of opposed handles disposed proximate the first end portion.

13. The splatter protector of claim 1, wherein the splatter protector is of one-piece construction.

14. The splatter protector of claim 1, wherein the first and second end portions are capable of collecting condensation.

15. A kit comprising the splatter protector of claim 1 and a lid for covering at least one of the end opening defined by the first end portion and the end opening defined by the second end portion of the splatter protector.

16. The kit of claim 15, wherein the lid includes a groove for receiving the annular lip of one of the first and second end portions of the splatter protector.

17. The kit of claim 15, wherein when the lid is seated on the annular lip of one of the first and second end portions, there is a gap between the lid and the outer edge of the splatter protector corresponding to the annular lip on which the lid is seated.

18. The kit of claim 15, wherein when the lid covers one of the end openings of the splatter protector, the splatter protector is capable of collecting condensation formed at the lid.

19. The kit of claim 15, wherein when the lid is seated on one of the end openings of the splatter protector, the end portion on which the lid is seated is capable of collecting condensation formed at the lid.

20. A splatter protector comprising:
    a hollow body movable between an expanded configuration, a semi-collapsed configuration, and a compact configuration by folding and unfolding the hollow body, the hollow body having:

a plurality of annular grooves defined in the hollow body for facilitating the folding and unfolding of the hollow body; and oppositely-directed first and second end portions, each of the end portions defining a respective substantially circular end opening having an annular lip along the circumference thereof to form a channel for receiving upper edges of cooking vessels and seating the splatter protector on the upper edges of the cooking vessels, wherein the diameter of the end opening defined by the first end portion is greater than the diameter of the end opening defined by the second end portion.

* * * * *